(12) United States Patent
Sheridan et al.

(10) Patent No.: US 11,255,337 B2
(45) Date of Patent: Feb. 22, 2022

(54) GEARED TURBOFAN WITH OVERSPEED PROTECTION

(71) Applicant: United Technologies Corporation, Farmington, CT (US)

(72) Inventors: William G. Sheridan, Southington, CT (US); Michael E. McCune, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 22 days.

(21) Appl. No.: 16/825,370

(22) Filed: Mar. 20, 2020

(65) Prior Publication Data

US 2020/0217324 A1    Jul. 9, 2020

Related U.S. Application Data

(63) Continuation of application No. 15/625,144, filed on Jun. 16, 2017, now Pat. No. 10,612,555.

(51) Int. Cl.
*F02C 7/06* (2006.01)
*F01D 21/04* (2006.01)
(Continued)

(52) U.S. Cl.
CPC ............. *F04D 25/163* (2013.01); *F01D 5/02* (2013.01); *F01D 15/12* (2013.01); *F01D 21/02* (2013.01);
(Continued)

(58) Field of Classification Search
CPC .......... F01D 15/12; F01D 21/02; F01D 21/04; F01D 21/045; F02C 7/06; F02C 7/36; F05D 2260/40311; F05D 2260/50
See application file for complete search history.

(56) References Cited

U.S. PATENT DOCUMENTS

| | | | |
|---|---|---|---|
| 4,380,896 | A | 4/1983 | Wiebe |
| 4,512,159 | A | 4/1985 | Memmen |

(Continued)

FOREIGN PATENT DOCUMENTS

| | | | |
|---|---|---|---|
| EP | 3000989 | A1 | 3/2016 |
| EP | 3144487 | A1 | 3/2017 |

(Continued)

OTHER PUBLICATIONS

European Search Report for EP Application No. 20163824.4 dated Jun. 5, 2020.

(Continued)

*Primary Examiner* — Andrew H Nguyen
(74) *Attorney, Agent, or Firm* — Carlson, Gaskey & Olds, P.C.

(57) ABSTRACT

A gas turbine engine has a fan drive turbine driving a gear reduction, the gear reduction, in turn, driving a fan rotor, the fan rotor delivering air into a bypass duct as bypass air and into a compressor section as core flow. A forward bearing is positioned between the gear reduction and the fan rotor and supports the gear reduction. A second bearing is positioned aft of the gear reduction and supports the gear reduction. The second bearing is a thrust bearing. A fan drive turbine drive shaft drives the gear reduction. The fan drive turbine drive shaft has a weakened link which is aft of the second bearing such that the fan drive turbine drive shaft will tend to fail at the weakened link, and at a location aft of the second bearing.

12 Claims, 4 Drawing Sheets

(51) Int. Cl.
*F01D 21/02* (2006.01)
*F02C 7/36* (2006.01)
*F04D 25/16* (2006.01)
*F01D 5/02* (2006.01)
*F01D 15/12* (2006.01)
*F04D 25/04* (2006.01)
*F04D 29/041* (2006.01)
*F04D 29/046* (2006.01)
*F16H 1/28* (2006.01)
*F16H 57/10* (2006.01)

(52) U.S. Cl.
CPC ............ *F01D 21/04* (2013.01); *F01D 21/045* (2013.01); *F02C 7/06* (2013.01); *F02C 7/36* (2013.01); *F04D 25/045* (2013.01); *F04D 29/041* (2013.01); *F04D 29/046* (2013.01); *F16H 1/28* (2013.01); *F16H 57/10* (2013.01); *F05D 2220/32* (2013.01); *F05D 2240/60* (2013.01); *F05D 2260/40311* (2013.01); *F05D 2260/50* (2013.01); *F05D 2300/50* (2013.01)

(56) References Cited

U.S. PATENT DOCUMENTS

| | | | |
|---|---|---|---|
| 5,291,732 A | 3/1994 | Halila | |
| 6,135,712 A | 10/2000 | Chevrollier et al. | |
| 6,240,719 B1 | 6/2001 | Vondrell et al. | |
| 6,397,603 B1 | 6/2002 | Edmondson et al. | |
| 6,428,269 B1 | 8/2002 | Boratgis et al. | |
| 6,447,248 B1 | 9/2002 | Kastl et al. | |
| 6,571,560 B2 | 6/2003 | Tatsumi et al. | |
| 6,655,147 B2 | 12/2003 | Farmer et al. | |
| 6,895,757 B2 | 5/2005 | Mitchell et al. | |
| 6,895,761 B2 | 5/2005 | Mitchell et al. | |
| 6,904,757 B2 | 6/2005 | Mitchell et al. | |
| 6,931,855 B2 | 8/2005 | Glessner et al. | |
| 7,237,389 B2 | 7/2007 | Ryan et al. | |
| 7,318,685 B2 | 1/2008 | Bouchy et al. | |
| 7,546,743 B2 | 6/2009 | Bulman et al. | |
| 7,603,844 B2 | 10/2009 | Moniz et al. | |
| 7,841,165 B2 | 11/2010 | Orlando et al. | |
| 8,141,370 B2 | 3/2012 | Bulman et al. | |
| 8,215,115 B2 | 7/2012 | Adair et al. | |
| 8,266,886 B2 | 9/2012 | McCune et al. | |
| 8,621,871 B2 | 1/2014 | McCune et al. | |
| 9,017,010 B2 | 4/2015 | Otto | |
| 2002/0108378 A1 | 8/2002 | Ariyoshi et al. | |
| 2004/0261419 A1 | 12/2004 | McCaffrey et al. | |
| 2005/0086945 A1 | 4/2005 | Tiemann | |
| 2007/0084183 A1 | 4/2007 | Moniz et al. | |
| 2010/0257864 A1 | 10/2010 | Prociw et al. | |
| 2012/0328366 A1 | 12/2012 | Jarmon et al. | |
| 2013/0152591 A1 | 6/2013 | Dery | |
| 2013/0186056 A1 | 7/2013 | Gerez et al. | |
| 2013/0186058 A1 | 7/2013 | Sheridan et al. | |
| 2016/0025003 A1* | 1/2016 | Schwarz | F02C 3/107 415/69 |
| 2016/0053689 A1 | 2/2016 | Morton | |
| 2017/0096941 A1 | 4/2017 | Antelo et al. | |
| 2017/0175753 A1 | 6/2017 | Tan-Kim et al. | |
| 2018/0080387 A1 | 3/2018 | Boniface | |

FOREIGN PATENT DOCUMENTS

| | | |
|---|---|---|
| EP | 3296540 A1 | 3/2018 |
| GB | 2377731 A | 1/2003 |

OTHER PUBLICATIONS

European Search Report for EP Application No. 18178114.7 dated Oct. 10, 2018.

\* cited by examiner

GEARED TURBOFAN WITH OVERSPEED PROTECTION

CROSS-REFERENCE TO RELATED APPLICATION

This application is a continuation of U.S. patent application Ser. No. 15/625,144 filed Jun. 16, 2017.

BACKGROUND OF THE INVENTION

This application relates to a geared turbofan wherein a gear reduction is straddle mounted with supporting bearings positioned both forward and aft of the gear reduction, and wherein overspeed protection is provided.

Gas turbine engines are known and typically include a fan delivering air into a bypass duct as propulsion and into a compressor as core airflow. The air is compressed in the compressor and delivered into a combustion section where it is mixed with fuel and ignited. Products of this combustion pass downstream over turbine rotors driving them to rotate.

Historically, the fan rotor rotated as one with the fan drive turbine. This resulted in compromise in the design as it may be desirable to have the turbine rotate at a higher speed than the fan.

Thus, it has been proposed to include a gear reduction between the fan drive turbine and the fan rotor.

More recently, the assignee of the present application has developed a commercial gas turbine engine wherein a gear reduction is placed between a low pressure compressor and a fan, such that a fan drive turbine drives the low pressure compressor at one speed and drives the fan at a slower speed.

Such commercial engines have supported the gear reduction on two bearings forwardly of the gear reduction.

It has also been proposed to straddle mount a gear reduction. In a straddle mount gear reduction, bearings are placed on a forward side and on an aft side of the gear reduction. Such an arrangement raises challenges in the event of a failure of a component in the drivetrain of the fan.

SUMMARY OF THE INVENTION

In a featured embodiment, a gas turbine engine has a fan drive turbine driving a gear reduction, the gear reduction, in turn, driving a fan rotor, the fan rotor delivering air into a bypass duct as bypass air and into a compressor section as core flow. A forward bearing is positioned between the gear reduction and the fan rotor and supports the gear reduction. A second bearing is positioned aft of the gear reduction and supports the gear reduction. The second bearing is a thrust bearing. A fan drive turbine drive shaft drives the gear reduction. The fan drive turbine drive shaft has a weakened link which is aft of the second bearing such that the fan drive turbine drive shaft will tend to fail at the weakened link, and at a location aft of the second bearing.

In another embodiment according to the previous embodiment, the compressor section includes a low pressure compressor and a high pressure compressor and the low pressure compressor also is driven by the gear reduction to rotate with the fan.

In another embodiment according to any of the previous embodiments, the compressor section includes a low pressure compressor and a high pressure compressor. The low pressure compressor is driven at a common speed by the fan drive turbine drive shaft.

In another embodiment according to any of the previous embodiments, the compressor section includes a low pressure compressor and a high pressure compressor and the second bearing is positioned intermediate the low pressure compressor and the high pressure compressor.

In another embodiment according to any of the previous embodiments, a catcher is provided to resist movement of the gear reduction and the fan rotor in an outer direction in the event of a failure of a fan rotor bearing.

In another embodiment according to any of the previous embodiments, the gear reduction is an epicyclic gear reduction.

In another embodiment according to any of the previous embodiments, the epicyclic gear reduction includes a sun gear driving intermediate gears, a static ring gear, and a carrier rotating when driven by the sun gear, the carrier being attached to a fan drive shaft to drive the fan rotor, and the catcher includes a member attached to a static structure and having a radially inner end forward of a flange on the fan drive shaft, and the catcher being contacted by the flange should the gear reduction move in a forward direction, to resist movement of the gear reduction.

In another embodiment according to any of the previous embodiments, the epicyclic gear reduction includes a sun gear, intermediate gears driven by the sun gear, and a ring gear driven by the intermediate gears, with a static carrier, and the ring gear driving the fan drive shaft, the catcher including a member having a radially outer location positioned forwardly of a radially inwardly extending flange which rotates with the fan drive shaft, the catcher being controlled by the flange should the gear reduction move in a forward direction, the catcher to resist movement of the gear reduction.

In another embodiment according to any of the previous embodiments, the catcher is formed of two parts with an intermediate gap.

In another embodiment according to any of the previous embodiments, the gear reduction is an epicyclic gear reduction.

In another featured embodiment, a gas turbine engine has a fan drive turbine driving a gear reduction, the gear reduction, in turn, driving a fan rotor, the fan rotor delivering air into a bypass duct as bypass air and into a compressor section as core flow. A forward bearing is positioned between the gear reduction and the fan rotor and supports the gear reduction. A second bearing is positioned aft of the gear reduction and supports the gear reduction. The second bearing is a thrust bearing. A fan drive turbine drive shaft drives ng the gear reduction. A catcher is provided to resist movement of the gear reduction and the fan rotor in an outer direction in the event of a failure of the second bearing. The gear reduction is an epicyclic gear reduction.

In another embodiment according to the previous embodiment, the epicyclic gear reduction includes a sun gear driving intermediate gears, a static ring gear, and a carrier rotating when driven by the sun gear, the carrier being attached to a fan drive shaft to drive the fan rotor.

In another embodiment according to any of the previous embodiments, the catcher includes a member having a radially inner location positioned forwardly of a radially outwardly extending flange which rotates with the fan drive shaft, the catcher being contacted by the flange should the gear reduction move in a forward direction, the catcher to resist movement of the gear reduction.

In another embodiment according to any of the previous embodiments, the epicyclic gear reduction includes a sun gear, intermediate gears driven by the sun gear, and a ring gear driven by the intermediate gears, with a static carrier, and the ring gear driving the fan drive shaft.

In another embodiment according to any of the previous embodiments, the catcher includes a member having a radially outer location positioned forwardly of a radially inwardly extending flange which rotates with the fan drive shaft, the catcher being contacted by the flange should the gear reduction move in a forward direction, the catcher to resist movement of the gear reduction.

In another embodiment according to any of the previous embodiments, the catcher is formed of two parts with an intermediate gap.

In another embodiment according to any of the previous embodiments, the compressor section includes a low pressure compressor and a high pressure compressor and the low pressure compressor also being driven by the gear reduction to rotate with the fan.

In another embodiment according to any of the previous embodiments, the compressor section including a low pressure compressor and a high pressure compressor and the second bearing being positioned intermediate the low pressure compressor and the high pressure compressor.

In another embodiment according to any of the previous embodiments, the compressor section including a low pressure compressor and a high pressure compressor and the low pressure compressor being driven at a common speed by the fan drive turbine drive shaft.

In another embodiment according to any of the previous embodiments, the compressor section including a low pressure compressor and a high pressure compressor and the second bearing being positioned intermediate the low pressure compressor and the high pressure compressor.

These and other features may be best understood from the following drawings and specification.

DETAILED DESCRIPTION

Figure 1:
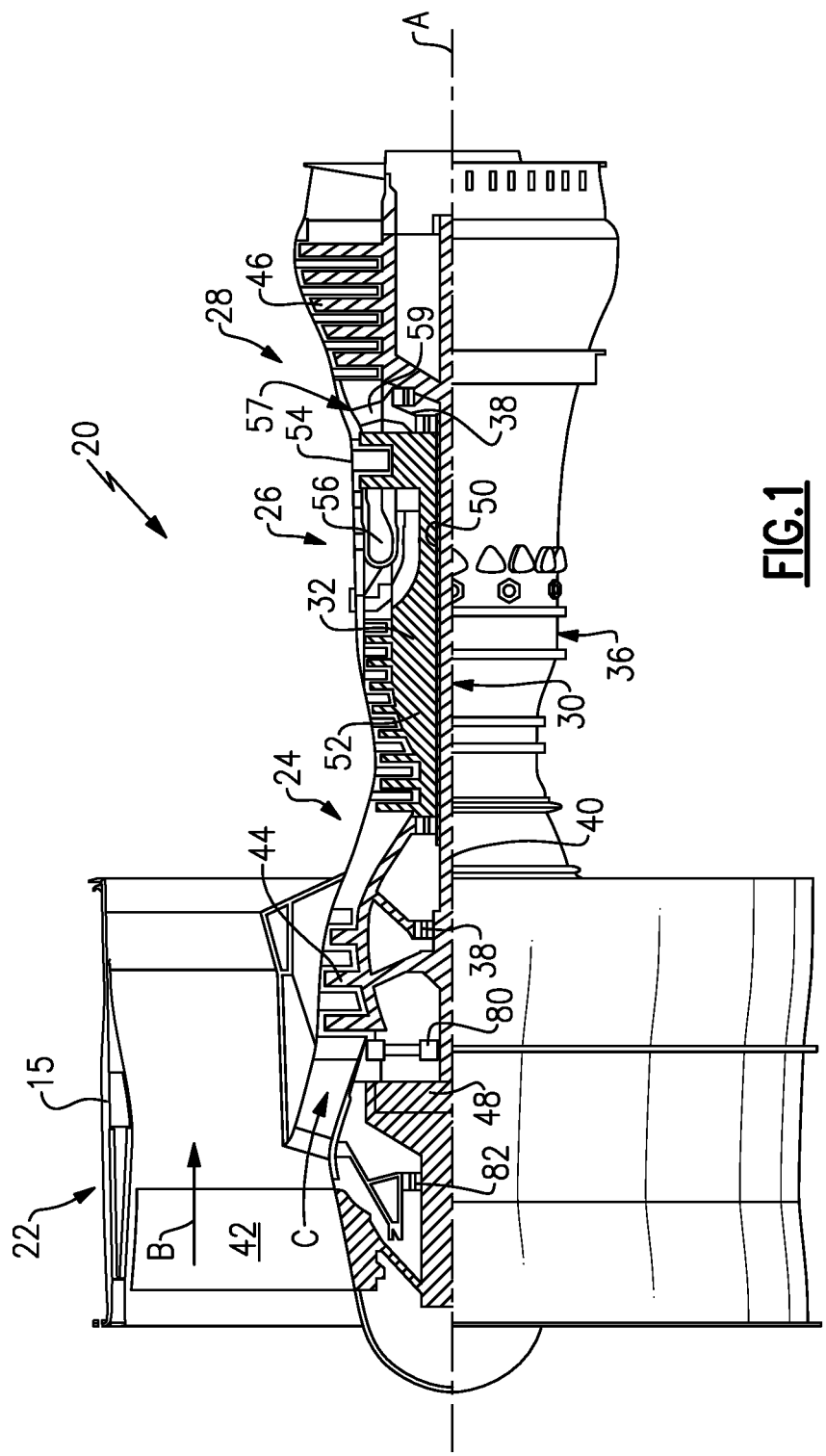
FIG. 1 schematically shows a first gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6) and less than twenty-five (25.0), with example embodiments being greater than about ten (10.0, or between fifteen (15.0) and twenty (20.0), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1 and less than 20.0:1, such as between about 10.0 and 15.0. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than 5.0, or equal to, or less than 4.0. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R.})/(518.7° \text{R.})]^{0.5}$. The "Low corrected fan tip speed" as disclosed herein according to one non-limiting embodiment is less than about 1150 ft/second (350.5 meters/second).

As shown, a first bearing 82 is positioned forwardly of the gear reduction 48 and a second bearing 80 is positioned aft of the gear reduction 48. While the bearings 80/82 are shown schematically, the bearing arrangement may be as shown in more detail in FIG. 2.

Figure 2:
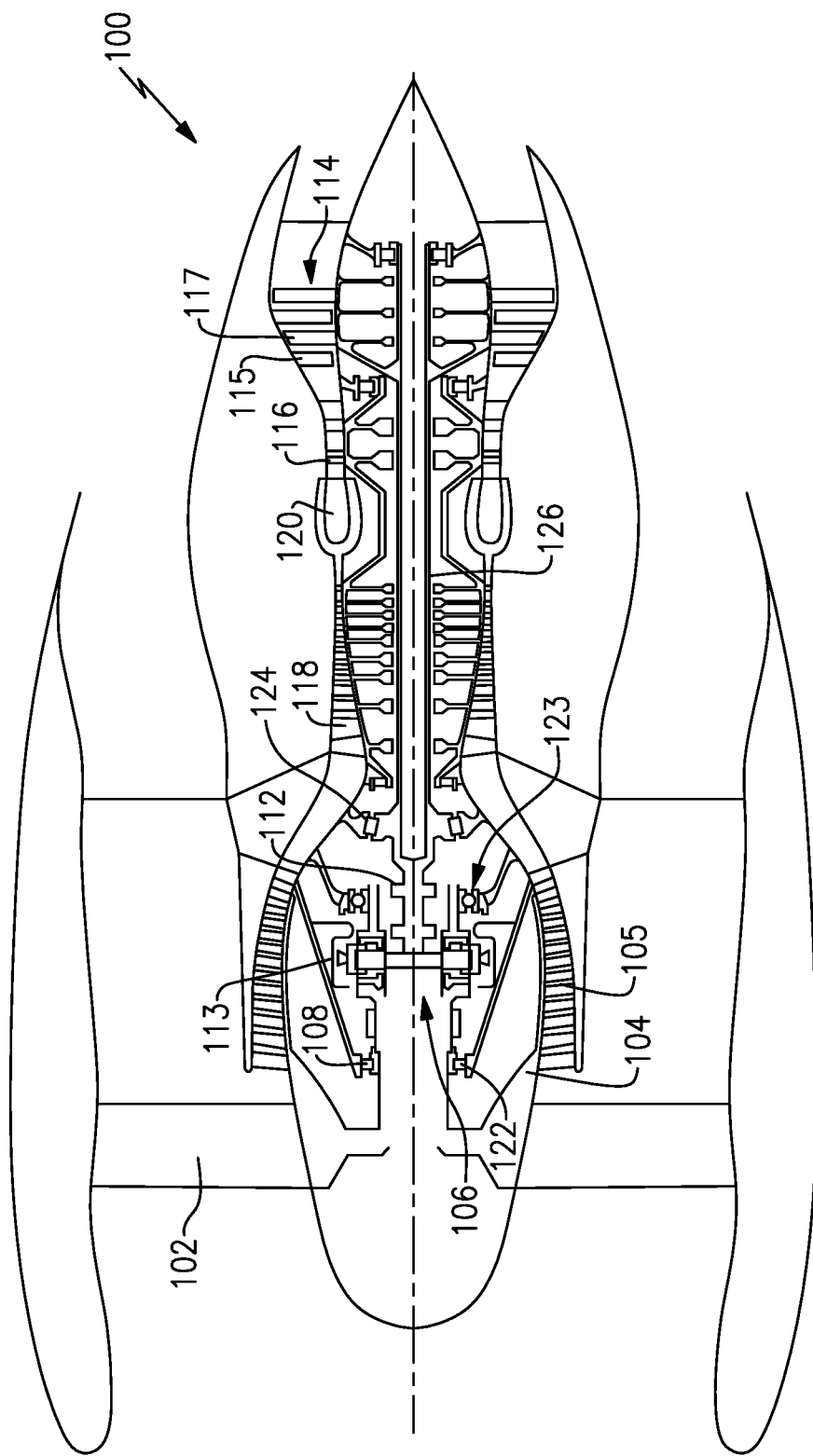
FIG. 2 schematically shows a second gas turbine engine.

FIG. 2 shows an engine embodiment 100 wherein a fan 102 rotates as one with a low pressure compressor hub 104 having compressor blades 105. The gear reduction 106 thus reduces the speed of a fan driven by a fan drive turbine 114, but the low pressure compressor hub 104 and fan 102 rotate at the same speed.

The quantities mentioned above with regard to FIG. 1 might also apply to the FIG. 2 engine.

A flexible drive connection 112 connects the fan drive turbine 114 to drive the gear reduction 106 as will be better explained below. While a flexible drive connection is shown, a more rigid connection may be utilized within the scope of this disclosure. Also, a flexible mount 113 is schematically shown for the gear reduction 106.

The fan drive turbine 114 is shown to have rotating blades 117 and static vanes 115.

A high pressure compressor 118 is driven by a high pressure turbine 116. A combustor 120 is intermediate turbine 116 and compressor 118.

Bearing 108 is forward of gear reduction 106 and thrust bearing 124 is aft of the gear reduction 106. A low turbine shaft 126 is located between thrust bearing 124 and fan drive turbine 114 such that it drives flexible connection 112.

Note, thrust bearing 124 is forward of combustor 120 and axially between the low and high pressure compressors 104/118.

With the engine shown in FIG. 2, should there be a failure of the drivetrain forward of thrust bearing 124, the low turbine 114 could over-speed since there is no resisting torsional load to slow it down. Thrust bearing 124 will enable the turbine to maintain an axial running position with hot gases and fuel from the combustor attempting to accelerate the turbine without having the resistive force from the fan and low compressor to slow it down. This is an undesirable condition.

Figure 3:
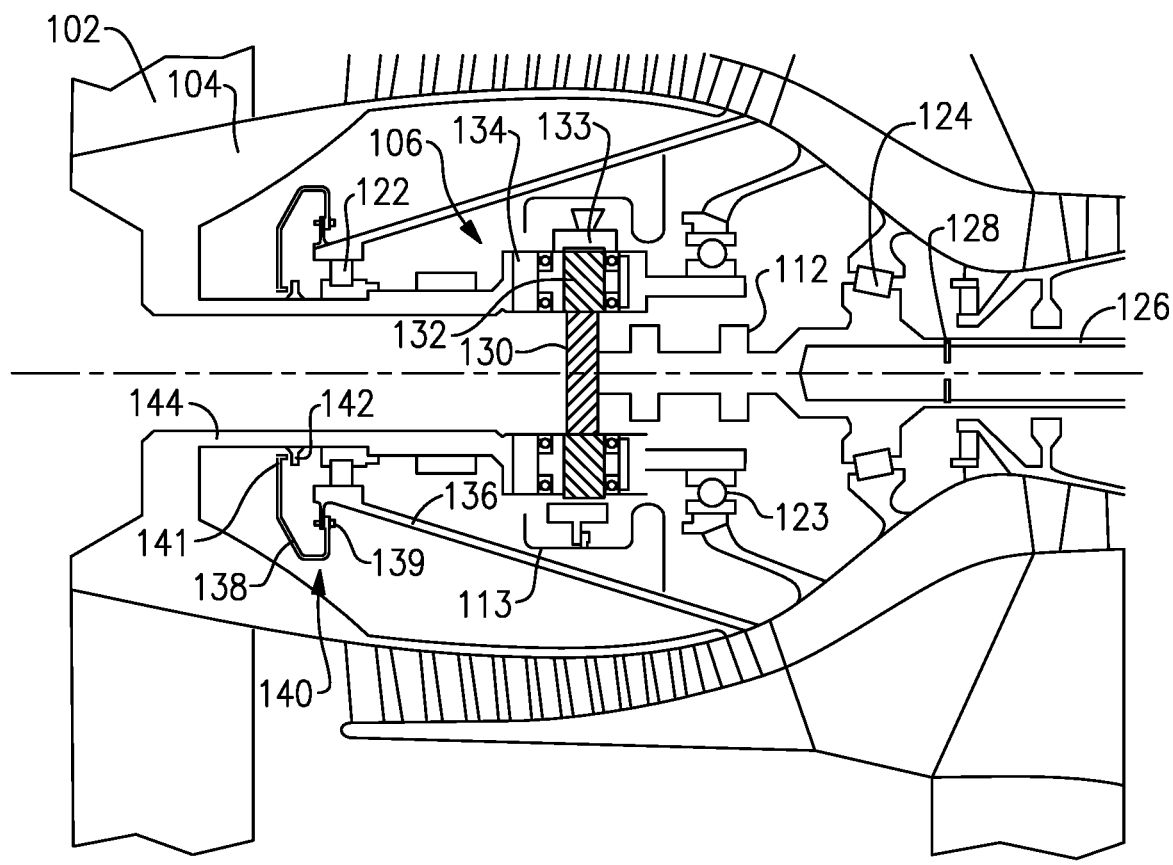
FIG. 3 shows a first embodiment safety feature.

Thus, FIG. 3 shows a detail wherein a weakened link 128 is formed in a turbine drive shaft 126 aft of the thrust bearing 124. The gear reduction is a so-called planetary system. Now, should there be a failure in the drivetrain, it will tend to be at the weakened link 128. When this failure occurs, rather than the turbine section overspeeding, the turbine will disengage from its axial position and move aft since thrust bearing 124 will no longer hold it, and the rotating blades 117 will contact the static vanes 115. The rotation of the fan drive turbine 114 will be stopped or at least prevented from accelerating to an unsafe speed avoiding the undesired condition previously mentioned Similar undesirable conditions can happen with the fan rotor 102 as shown in FIG. 3 when it experiences bearing failure. FIG. 3 depicts a gear drive 106 that is straddle mounted by two bearings 122 and 123. Bearing 122 is a radial bearing that can react radial loads but not axial loads. Bearing 123 is a thrust bearing that can react both radial loads and axial thrust loads. Bearing 123 reacts the axial thrust load from fan 102. As further shown, there is a catcher or retainer feature 140. The input drive 112 drives the sun gear 130 in this embodiment, which, in turn, engages intermediate gears 132. A ring gear 133 in this embodiment is static. Thus, a carrier 134 rotates to, in turn, drive a fan driveshaft 144 that rotates with the fan shaft. It should be understood this arrangement can be utilized with the engines of FIG. 1 or 2.

A catcher 140 includes a frame 138 bolted at 139 to a static frame 136. In the event of failure of thrust bearing 123, the gear reduction 106 and the fan 102 may be urged forwardly or to the left in FIG. 3. However, the catcher 140 has a radially inner portion 141 which is radially inward of a flange 142 on shaft the 144. The catcher 140 is formed of sufficiently strong material that it can contact, catch and hold the flange 142, and hence resist movement of the gear reduction 106 and fan 102 to the left or outwardly of the engine.

Figure 4:
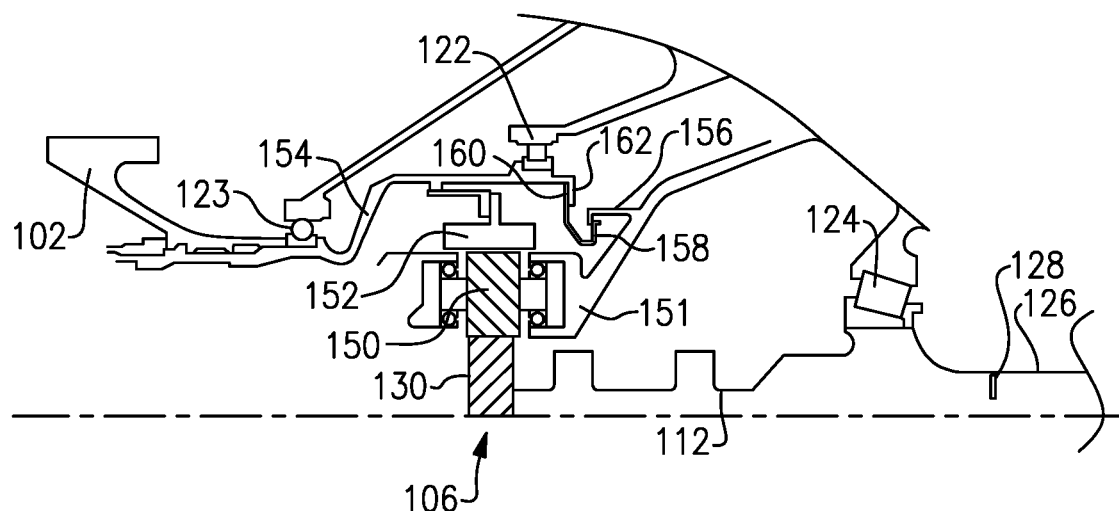
FIG. 4 shows a second embodiment.

FIG. 4 shows an embodiment wherein the gear reduction is a so-called "star gear" system. Structure, which is similar to that of FIG. 3, is identified by the same reference numeral. Here, however, the carrier 151 is static. The intermediate gears 150 still rotate with the sun gear 130 and drive a ring gear 152. Ring gear 152 drives a shaft 154 to, in turn, rotate the fan. In FIG. 4, the gear drive 106 is also straddle mounted by two bearings 123 and 122, but their positions are reversed such that thrust bearing 123 is forward of gear drive 106. This embodiment may also be used with the engines of FIG. 1 or 2.

In this embodiment, a catcher 158 has a radially outermost edge 160, which is forward of a flange 162 associated with the shaft 154. The catcher 158 is again bolted to a frame structure 156, which is illustrated as associated with the carrier 151.

Now, should thrust bearing 123 fail, the catcher 160 will catch the flange 162 and resist movement of the gear reduction and fan forwardly and outwardly of the engine.

Figure 5:
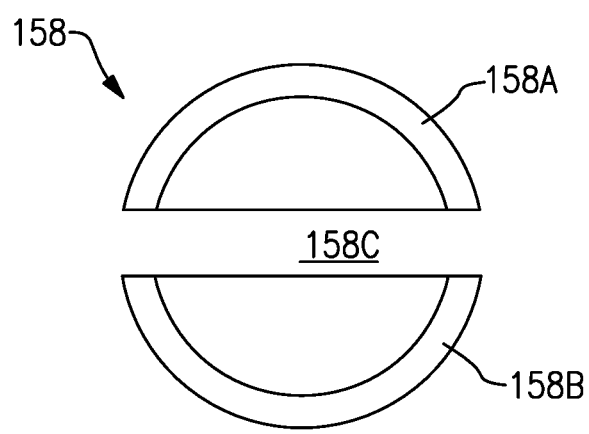
FIG. 5 shows a detail of the second embodiment.

FIG. 5 shows a detail of the catcher 158 having two halves 158A and 158B with an intermediate space 158C. This will facilitate assembly of the catcher, which may otherwise be complex in the environment as illustrated in FIG. 4.

The thrust bearings as disclosed and claimed may be any type thrust bearing, including ball bearings, tapered roller bearings and spherical roller bearings, among others.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprises:
a fan drive turbine driving a gear reduction, said gear reduction, in turn, driving a fan rotor, said fan rotor delivering air into a bypass duct as bypass air and into a compressor section as core flow;
a forward bearing positioned between said gear reduction and said fan rotor and supporting said gear reduction, and a second bearing positioned aft of said gear reduction and supporting said gear reduction, and said second bearing being a thrust bearing;
a fan drive turbine drive shaft driving said gear reduction;

a catcher provided to resist movement of said gear reduction and said fan rotor in an outer direction in the event of a failure of said second bearing, a member of said catcher being fixed to a static structure;

said gear reduction is an epicyclic gear reduction; and wherein said catcher includes the member having a radially outer location positioned forwardly of a radially inwardly extending flange which rotates with said fan drive shaft, said catcher being contacted by said flange should said gear reduction move in a forward direction, to resist movement of said gear reduction.

2. The gas turbine engine as set forth in claim 1, wherein said epicyclic gear reduction includes a sun gear, intermediate gears driven by said sun gear, and a ring gear driven by said intermediate gears, with a static carrier, and said ring gear driving said fan drive shaft.

3. The gas turbine engine as set forth in claim 2, wherein said catcher is on an opposed side of said gear reduction relative to said fan rotor.

4. The gas turbine engine as set forth in claim 3, wherein said catcher is formed of two parts with an intermediate gap.

5. The gas turbine engine as set forth in claim 4, wherein said compressor section includes a low pressure compressor and a high pressure compressor and said low pressure compressor also being driven by said gear reduction to rotate with said fan rotor.

6. The gas turbine engine as set forth in claim 3, wherein said compressor section includes a low pressure compressor and a high pressure compressor and said low pressure compressor also being driven by said gear reduction to rotate with said fan rotor.

7. The gas turbine engine as set forth in claim 3, wherein said compressor section including a low pressure compressor and a high pressure compressor and said second bearing being positioned intermediate said low pressure compressor and said high pressure compressor.

8. The gas turbine engine as set forth in claim 1, wherein said catcher is on an opposed side of said gear reduction relative to said fan rotor.

9. The gas turbine engine as set forth in claim 1, wherein said compressor section including a low pressure compressor and a high pressure compressor and said low pressure compressor being driven at a common speed by said fan drive turbine drive shaft.

10. The gas turbine engine as set forth in claim 1, wherein said compressor section including a low pressure compressor and a high pressure compressor and said second bearing being positioned intermediate said low pressure compressor and said high pressure compressor.

11. A gas turbine engine comprises:

a fan drive turbine driving a gear reduction, said gear reduction, in turn, driving a fan rotor, said fan rotor delivering air into a bypass duct as bypass air and into a compressor section as core flow;

a forward bearing positioned between said gear reduction and said fan rotor and supporting said gear reduction, and a second bearing positioned aft of said gear reduction and supporting said gear reduction, and said second bearing being a thrust bearing;

a fan drive turbine drive shaft driving said gear reduction;

a catcher provided to resist movement of said gear reduction and said fan rotor in an outer direction in the event of a failure of said second bearing, a member of said catcher being fixed to a static structure;

said gear reduction is an epicyclic gear reduction;

wherein said compressor section includes a low pressure compressor and a high pressure compressor and said low pressure compressor also being driven by said gear reduction to rotate with said fan rotor; and wherein said epicyclic gear reduction includes a sun gear, intermediate gears driven by said sun gear, and a ring gear driven by said intermediate gears, with a static carrier, and said ring gear driving said fan drive shaft, said catcher includes the member having a radially outer location positioned forwardly of a radially inwardly extending flange which rotates with said fan drive shaft, said catcher being contacted by said flange should said gear reduction move in a forward direction, to resist movement of said gear reduction.

12. The gas turbine engine as set forth in claim 11, wherein said catcher is formed of two parts with an intermediate gap.

* * * * *